United States Patent
Childress

(10) Patent No.: US 12,000,176 B2
(45) Date of Patent: Jun. 4, 2024

(54) LATCHING SYSTEMS AND METHODS

(71) Applicant: THE BOEING COMPANY, Chicago, IL (US)

(72) Inventor: Jamie J. Childress, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 135 days.

(21) Appl. No.: 17/472,906

(22) Filed: Sep. 13, 2021

(65) Prior Publication Data

US 2023/0082538 A1    Mar. 16, 2023

(51) Int. Cl.
E05B 47/00     (2006.01)
E05B 63/00     (2006.01)
B64D 11/02     (2006.01)

(52) U.S. Cl.
CPC ........ *E05B 47/004* (2013.01); *E05B 47/0012* (2013.01); *E05B 63/0065* (2013.01); *B64D 11/02* (2013.01); *E05B 2047/0056* (2013.01); *E05B 2047/0067* (2013.01)

(58) Field of Classification Search
CPC .............. E05B 47/004; E05B 47/0012; E05B 47/0038; E05B 63/0065; E05B 85/22; E05B 2047/0056; E05B 2047/0067; E05B 15/0073; B64D 11/02; E05Y 2900/502
USPC ...................................................... 292/251.5
See application file for complete search history.

(56) References Cited

U.S. PATENT DOCUMENTS

| | | | |
|---|---|---|---|
| 8,686,869 B2 * | 4/2014 | Sharma .............. | G01D 5/34715 70/276 |
| 9,523,219 B2 * | 12/2016 | Macernis .............. | E05B 47/004 |
| 10,641,021 B2 * | 5/2020 | Schneider ........... | E05B 47/0038 |
| 11,293,199 B1 * | 4/2022 | Vetter ................. | E05B 15/0073 |
| 2006/0049645 A1 * | 3/2006 | Drumm ................. | E05C 19/163 292/251.5 |
| 2009/0300988 A1 * | 12/2009 | Bem .................... | E05B 65/0035 70/101 |
| 2020/0224455 A1 * | 7/2020 | Ellefred ................ | E05C 19/163 |
| 2021/0102406 A1 | 4/2021 | Jaskiewicz | |

FOREIGN PATENT DOCUMENTS

| | | | | |
|---|---|---|---|---|
| DE | 102014105565 | | 10/2015 | |
| EP | 2692970 A1 * | | 2/2014 | ........... B64C 1/1407 |
| FR | 2653815 | | 5/1991 | |

(Continued)

OTHER PUBLICATIONS

Extended European Search Report for EP 22194988.6-1005, dated Jan. 16, 2023.

*Primary Examiner* — Kristina R Fulton
*Assistant Examiner* — James Edward Ignaczewski
(74) *Attorney, Agent, or Firm* — Joseph M. Butscher; The Small Patent Law Group LLC

(57) ABSTRACT

A latching system and method are configured to selectively latch and unlatch a first component in relation to a second component. The latching system and method include an actuator, a first coupler secured to the actuator, a latch, and a second coupler secured to the latch. The first coupler is configured to couple to the second coupler to couple the actuator to the latch. The first coupler is configured to uncouple from the second coupler to uncouple the actuator from the latch in response to the latch being manually operated.

20 Claims, 7 Drawing Sheets

(56) References Cited

FOREIGN PATENT DOCUMENTS

| | | | |
|---|---|---|---|
| GB | 2222627 | 3/1990 | |
| GB | 2517965 | 3/2015 | |
| GB | 2517965 A * | 3/2015 | ......... E05B 17/0083 |
| WO | WO 2014/016283 | 1/2014 | |

* cited by examiner

LATCHING SYSTEMS AND METHODS

FIELD OF THE DISCLOSURE

Examples of the present disclosure generally relate to latching systems and methods, such as can be used to selectively latch and unlatch various components (for example, doors, gates, or the like).

BACKGROUND OF THE DISCLOSURE

Latches, knobs, handles, and the like are used in relation to doors. With repeated use, such objects can become unclean and/or contaminated with germs, bacteria, viruses, and other such pathogens. As such, individuals may be reluctant to touch a door handle or latch, for example.

With that in mind, touchless sensors have been developed. Touchless sensors have been used in conjunction with various components. For example, certain stowage bins onboard commercial aircraft include touchless latches that allow individuals to open and close the stowage bins without touching any portion of the stowage bins. Instead, a swipe of a hand in proximity to a touchless latch opens a stowage bin, for example.

A touchless sensor can be used determine an intent to open a door, but is typically unable to actually open the door. Instead, an electromechanical system can be used to open the door. However, an individual may not understand how the touchless sensor in conjunction with the electromechanical system operates. As such, the individual may still grasp a portion of the mechanical latch, instead of engaging the touchless sensor.

SUMMARY OF THE DISCLOSURE

A need exists for an improved latching system and method that includes a touchless sensor. Further, a need exists for a latching system and method that also allows for manual operation of a mechanical feature, such as a latch. Moreover, a need exists for a latching system that allows for manual override in case a touchless sensor does not operate properly. Further, a need exists for a latching system and method having a touchless sensor and mechanical feature that do not interfere with each other, and are able to reset to a default condition appropriate for a desired door status (open, closed, locked, unlocked, latched, unlatched), for example.

With those needs in mind, certain examples of the present disclosure provide a latching system configured to selectively latch and unlatch a first component in relation to a second component. The latching system includes an actuator, a first coupler secured to the actuator, a latch, and a second coupler secured to the latch. The first coupler is configured to couple to the second coupler to couple the actuator to the latch. The first coupler is configured to uncouple from the second coupler to uncouple the actuator from the latch in response to the latch being manually operated.

In at least one example, a touchless sensor is operatively coupled to the actuator. The latching system can also include a sensing device configured to detect a relationship between the first coupler and the second coupler. The latching system can also include a control unit in communication with the actuator and the sensing device. As an example, the control unit is configured to operate the actuator to recouple the first coupler with the second coupler in response to the sensing device detecting that the first coupler is uncoupled from the second coupler.

In at least one example, the first component is a door, and the second component is one or more of a frame, wall, or panel.

In at least one example, a gap exists between the first coupler and the second coupler when the first coupler is coupled to the second coupler.

In at least one example, the first coupler is a first magnet and the second coupler is a second magnet. As a further example, a spring secures the first magnet to the actuator. The spring is configured to pull the first magnet toward the actuator. Also, as an example, a sleeve is disposed around the first magnet and the spring. The first magnet can include extension stops, and the sleeve can include stop protuberances configured to engage the extension stops. A roughened interface can be formed between the first magnet and the sleeve.

In at least one example, the first coupler includes one of a detent or a spring-biased member, and the second coupler includes the other of the detect of the spring-biased member.

Certain examples of the present disclosure provide a latching method configured to selectively latch and unlatch a first component in relation to a second component. The latching method includes coupling a first coupler secured to an actuator to a second coupler secured to a latch, wherein said coupling couples the actuator to the latch; and uncoupling the first coupler from the second coupler to uncouple the actuator from the latch in response to the latch being manually operated.

Certain examples of the present disclosure provide a system including a first component, a second component, and a latching system coupled to one or both of the first component or the second component. The latching system is configured to selectively latch and unlatch the first component in relation to the second component, as described herein.

DETAILED DESCRIPTION OF THE DISCLOSURE

Figure 1:
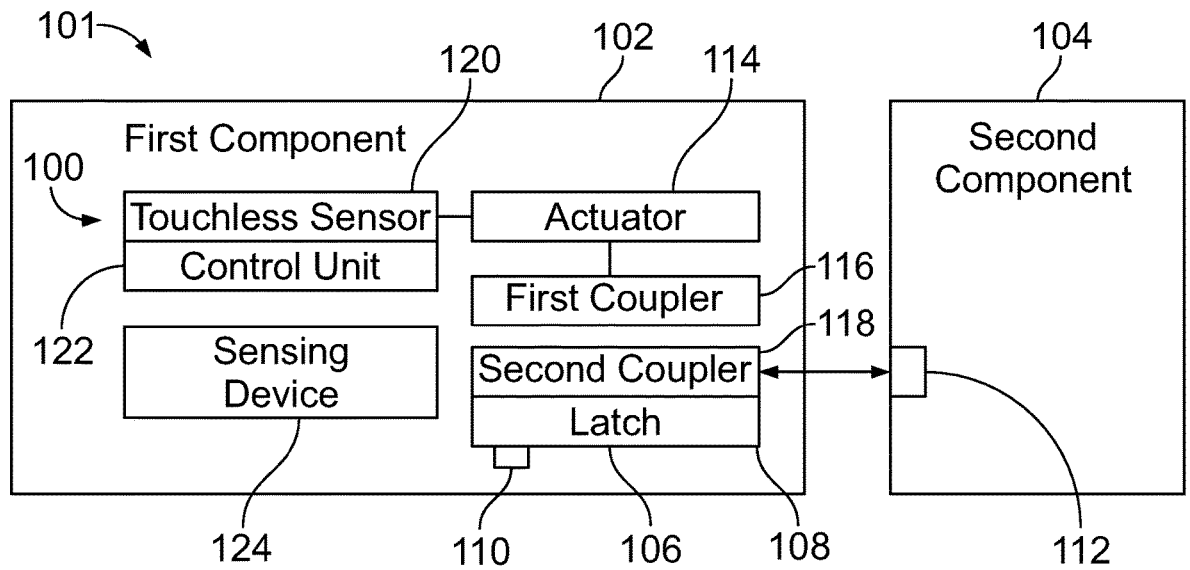
FIG. 1 illustrates a schematic diagram of a latching system, according to an example of the present disclosure.

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide a latching system and method that includes an actuator coupled to a mechanical latch via separable couplers, such as magnets, a ball/detent, and/or the like. The systems and methods are configured to allow manual override of position and easy reattachment of the actuator to the latch.

In at least one example, the actuator is coupled to the mechanical latch via couplers, such as magnets. A sensing device, such as a Hall sensor, can be used to detect the attachment/detachment between the magnets. The magnet attached to actuator can be coupled to a spring that increases a gap when magnetic contact is lost (reducing the magnetic coupling until repositioned). The system can automatically reacquire the magnetic attachment through electromechanical movement. In at least one example, no contact between the magnets is required. A small spacing (such as a spacing of 0.010 inches) can be used, but not required, both for ease of attach/detach and wear reduction.

Examples of the present disclosure can be used where manual mechanical override of an electromechanical system is routine (for example, can work in concert with touchless application). Any amount of displacement between magnets during mechanical override is possible (because the coupling is magnetic). The mechanical override displacement can be in multiple directions (in X, Y, or Z directions), and can also be mechanically changed away from a magnet pair in one direction. The attachment can be made and broken a numerous times using Neodymium or Samarium Cobalt magnets with extremely long magnetic lifetimes (excess of 100 years). With a non-contact system, there is no wear (non-contact is simply one option). In at least one example, the system automatically senses contact loss (via a magnetic sensing device, such as a Hall sensor), and can reacquire the contact.

The latching systems and methods can be used with various components, such as doors, stowage bins, containers, or the like. The components listed are merely examples. The latching systems and methods can be used with various other components. Examples of the present disclosure can be used in relation to applications in which manual mechanical override of an electromechanical system is routine.

FIG. 1 illustrates a schematic diagram of a latching system 100, according to an example of the present disclosure. The latching system 100 can be coupled to a first component 102, such as a door, gate, bin, container, and/or the like. The first component 102 is configured to be opened and closed with respect to a second component 104, such as a frame, panel, wall, strongback, beam, rail, track, and/or the like. Optionally, the latching system 100 can be coupled to the second component 104, instead of the first component 102. As shown, a system 101 includes the first component 102, the second component 104, and the latching system 100 coupled to one or both of the first component 102 or the second component 104. The terms first and second are merely for identifying a number of components. It is to be understood that the first component may be the second component, and vice versa.

The latching system 100 includes a latch 106 (for example, a mechanical latch) that is configured to be manually engaged by an individual. The latch 106 includes a latching element 108 coupled to an engagement member 110, such as a handle, knob, lever, and/or the like. An individual can grasp the engagement member 110 to move at least a portion of the latching element 108 into a retaining member 112 (such as a hasp, lock channel, recess, opening, or the like) of the second component 104 to lock the first component 102 in relation to the second component 104, or move at least a portion of the latching element 108 out of the retaining member 112 to unlock the first component 102 in relation to the second component 104.

The latching system 100 also includes an actuator 114 configured to be engaged to operate the latch 106. The actuator 114 can be an electromechanical device. The actuator 114 can be one or more of a ball screw, plunger, rotary motor, solenoid, and/or the like.

The actuator 114 is secured to a first coupler 116, such as a first magnet. The latch 106 is secured to a second coupler 118, such as a second magnet. Optionally, the first coupler 116 can be a detent, or a spring-biased object, and the second coupler 118 can be the opposite of the detect or the spring-biased object (or vice versa). The first coupler 116 is configured to securely couple to the second coupler 118, so that motion of the actuator 114 is translated to the latch 106. However, when the latch 106 is manually operated, the force exerted into the latch 106 can overcome the coupling force between the first coupler 116 and the second coupler 118, thereby causing the first coupler to separate from the second coupler 118. During or after such manual engagement of the latch 106, the first coupler 116 reconnects with the second coupler 118, thereby reconnecting the actuator 114 to the latch 106.

In at least one example, a touchless sensor 120 is operatively coupled to the actuator 114. The touchless sensor 120 is configured to be engaged in a touchless manner by an object, such as a finger, handle, or the like, such as described in United States Patent Application No. 17/468.985, entitled "Touchless Sensor Systems and Methods," filed Sep. 8, 2021. For example, a finger or hand moved over the touchless sensor 120 (such as within 2 inches) can be used to trigger the touchless sensor 120 to move the actuator 114. As the actuator 114 is moved, the first coupler 116 (secured to the actuator) moves the second coupler 118 (secured to the latch 106), and therefore the latch 106 in relation to the retaining member 112 of the second component 104, as desired.

In at least one example, the touchless sensor 120 is coupled to, or otherwise includes a control unit 122 that is configured to control operation of the touchless sensor 120. For example, the control unit 122 includes or is otherwise coupled to a memory that stores instructions regarding triggering of the touchless sensor 120 in relation to detected motions of an object (such as a finger or hand) in relation to the touchless sensor 120.

Alternatively, the latching system 100 may not include the touchless sensor 120. For example, the actuator 114 may optionally be operatively coupled to a switch, button, key, and/or the like.

In at least one example, the latching system 100 also includes a sensing device 124 configured to detect a relationship between the first coupler 116 and the second coupler 118. The sensing device 124 can be a magnetic sensor. The sensing device 124 can be a Hall sensor, for example. As another example, the sensing device 124 can be an infrared sensor. As another example, the sensing device 124 can be an ultrasonic sensor. The sensing device 124 is in communication with the control unit 122, such as through one or more wired or wireless connections. Alternatively, the latching system 100 does not include the sensing device 124.

In at least one example, the control unit 122 is in communication with the actuator 114 and the sensing device 124. The control unit 122 (such as may be in communication with, or part of, the touchless sensor 120 or optionally another triggering device, such as a switch, key, button, or the like) is configured to operate the actuator 114 to recouple the first coupler 116 with the second coupler 118 in response to the sensing device 124 detecting that the first coupler 116 is uncoupled from the second coupler 118.

In operation, an individual can operate the latch 106 through the touchless sensor 120. For example, the individual can wave a finger or hand above or in front of the touchless sensor 120 to move the latch 106 into a locked position. The control unit 122 is configured to receive a signal from the touchless sensor 120 and recognize the detected motion. In response, the control unit 122 operates the actuator 114 accordingly. As the actuator 114 moves, the latch 106 moves so that the latching element 108 is inserted into the retaining member 112 to securely latch the first component 102 to the second component 104. The actuator 114 is operatively coupled to the latch 106 by the first coupler 116 being coupled to the second coupler 118, such as via a magnetic and/or mechanical connection. The touchless sensor 120 can be operated to unlatch the latch 106 from the second component 104 in a similar manner.

If, however, an individual manually engages the latch 106, such as via the engagement member 110, the second coupler 118 can separate from the first coupler 116. In this manner, the latch 106 can be manually overridden in relation to the actuator 114. The first coupler 116 may then recouple (for example, reconnect) to the second coupler 118 to reconnect the actuator 114 to the latch 106, such as via magnetic attraction. Optionally, the sensing device 124 can be used to detect the separation between the first coupler 116 and the second coupler 118. The control unit 122 receives a signal from the sensing device 124 that indicates the separation between the first coupler 116 and the second coupler 118. The control unit 122, in response to detection of separation between the first coupler 116 and the second coupler 118, then operates the actuator 114 to move the first coupler 116 back into alignment with the second coupler 118, thereby recoupling the first coupler 116 to the second coupler 118 (and therefore recoupling the actuator 114 with the latch 106).

As described herein, the latching system 100 is configured to selectively latch and unlatch the first component 102 in relation to the second component 104. The latching system 100 includes the actuator 114, the first coupler 116 secured to the actuator 114, the latch 106, and the second coupler 118 secured to the latch 106. The first coupler 116 couples to the second coupler 118 to couple the actuator 114 to the latch 106. The first coupler 116 is configured to uncouple from the second coupler 118 to uncouple the actuator 114 from the latch 106 in response to the latch 106 being manually operated.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 122 may be or include one or more processors that are configured to control operation, as described herein.

The control unit 122 is configured to execute a set of instructions that are stored in one or more data storage units or elements (such as one or more memories), in order to process data. For example, the control unit 122 may include or be coupled to one or more memories. The data storage units may also store data or other information as desired or needed. The data storage units may be in the form of an information source or a physical memory element within a processing machine.

The set of instructions may include various commands that instruct the control unit 122 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 122. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 122 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 2:
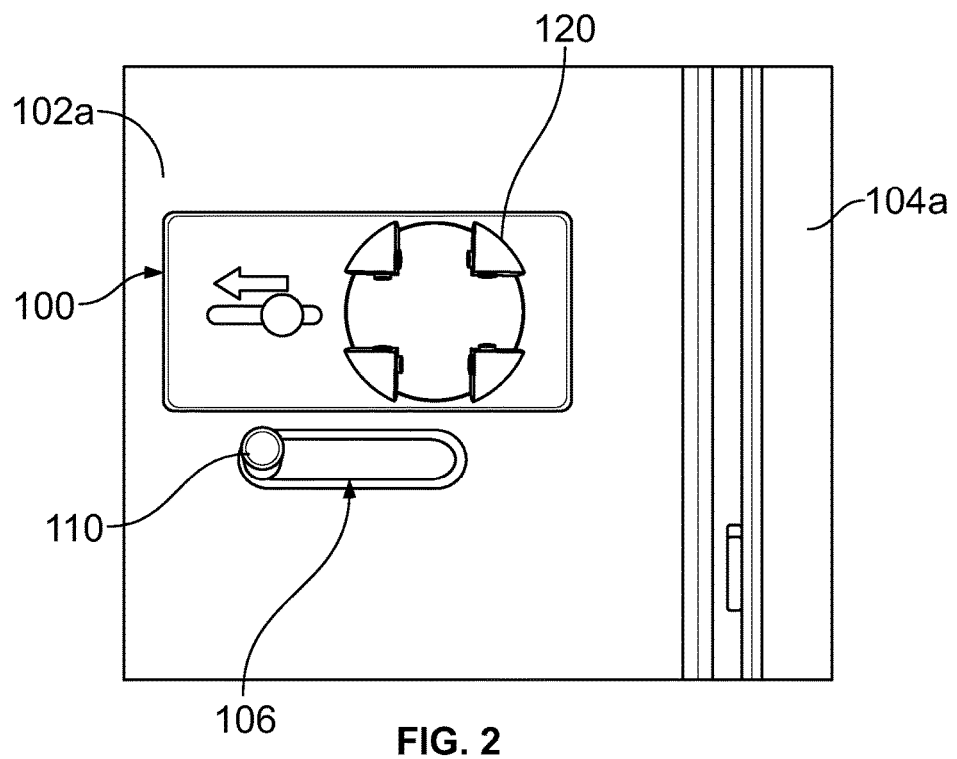
FIG. 2 illustrates a front view of a door in relation to a frame, according to an example of the present disclosure.

FIG. 2 illustrates a front view of a door 102a in relation to a frame 104a, according to an example of the present disclosure. The door 102a is an example of the first component 102 shown in FIG. 1. The frame 104a is an example of the second component 104 shown in FIG. 1. Optionally, the door 102a can be the second component, and the frame 104a can be the first component. The door 102a can be that of a lavatory, such as within a commercial aircraft, for example.

The latching system 100 is coupled to the door 102a (and/or optionally the frame 104a). The latching system 100 includes the touchless sensor 120 operatively coupled to the latch 106, as described above with respect to FIG. 1.

Figure 3:
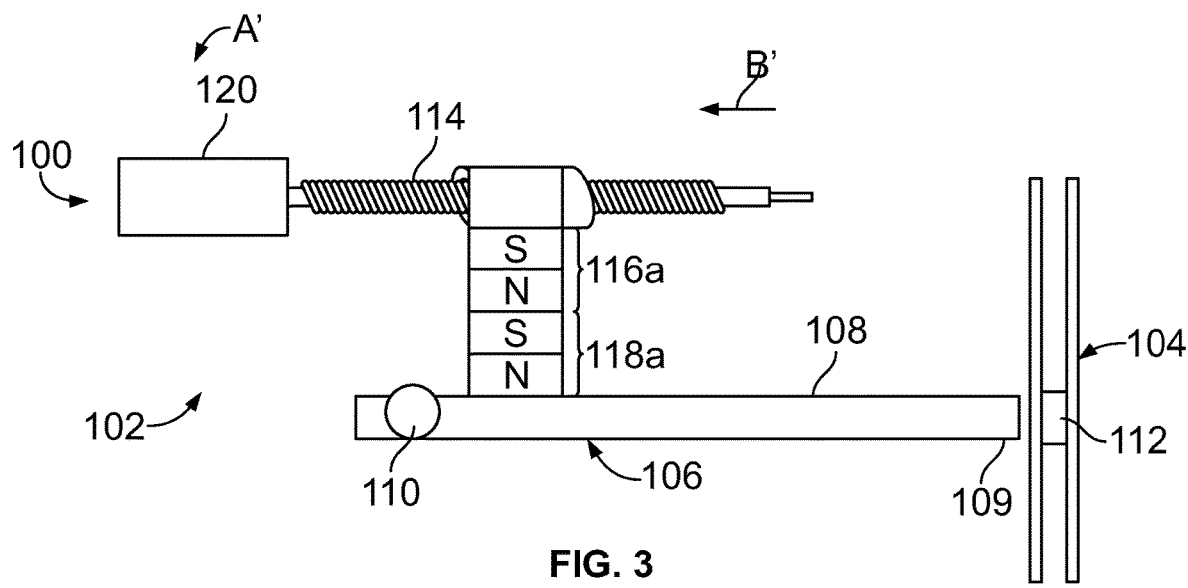
FIG. 3 illustrates a schematic diagram of the latching system in an unlatched position, according to an example of the present disclosure.

FIG. 3 illustrates a schematic diagram of the latching system 100 in an unlatched position, according to an example of the present disclosure. As shown, a first magnet 116a is secured to the actuator 114, and a second magnet 118a is secured to the latch 106. The first magnet 116a is an example of the first coupler 116 shown in FIG. 1, and the second magnet 118a is an example of the second coupler 118 shown in FIG. 1. The first magnet 116a and the second magnet 118a can be Neodymium or Samarium Cobalt magnets. Optionally, various other types of magnets can be used.

A magnetic force attracts the first magnet 116a to the second magnet 118a. That is, the first magnet 116a is magnetically coupled to the second magnet 118a. In this manner, the actuator 114 is coupled to the latch 106. In at least one example, a gap, such as between 0.001-0.020 inches, can be provided between the first magnet 116a and the second magnet 118a when coupled together. The gap eliminates, minimizes, or otherwise reduces friction and wear between the first magnet 116a and the second magnet 118a. Optionally, there may not be a gap between the first magnet 116a and the second magnet 118a when coupled together.

In the unlatched position, the latching element 108 is outside of the retaining member 112. Accordingly, the first component 102 can be opened in relation to the second component 104 (or vice versa).

Figure 4:
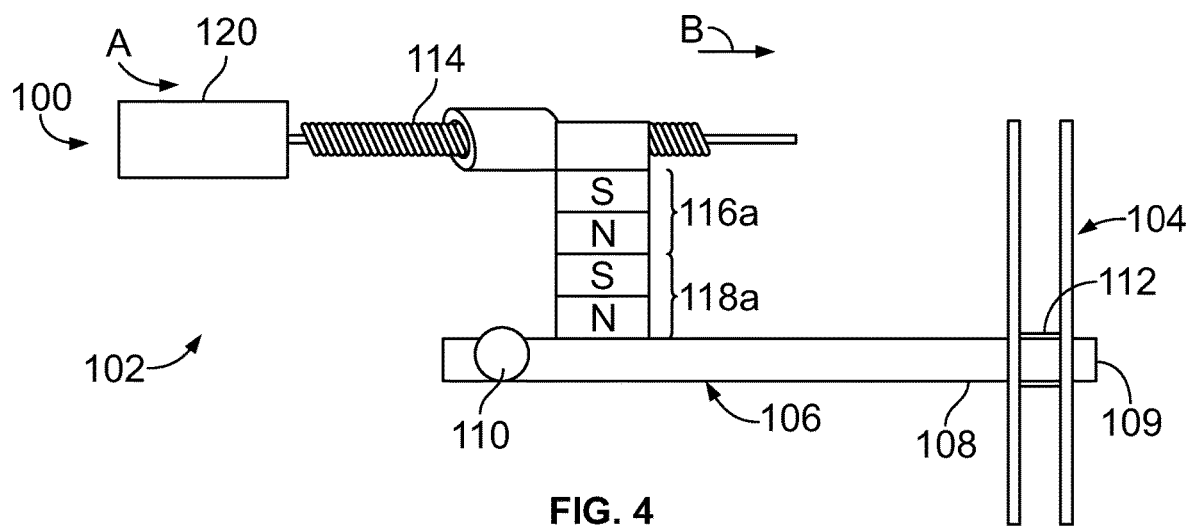
FIG. 4 illustrates a schematic diagram of the latching system in a latched position, according to an example of the present disclosure.

FIG. 4 illustrates a schematic diagram of the latching system 100 in a latched position, according to an example of the present disclosure. Referring to FIGS. 3 and 4, in order to latch the first component 102 to the second component 104 (such that at least a portion of the latching element 108 is securely retained by the retaining member 112), an individual performs a motion, such as swiping a finger or hand, in relation to (such as above and/or in front of) the touchless sensor 120 in the direction of arrow A. In response, the actuator 114 moves the latch 106 (via the first magnet 116a being coupled to the second magnet 118a) in the direction of arrow B, so that a distal end 119 of the latching element 108 is moved into the retaining member 112. In order to unlatch the first component 102 from the second component 104, the individual performs the motion in relation to the touchless sensor 120 in the direction of arrow A (or an opposite motion in the direction of arrow A'), which causes the actuator 114 to move back in the direction of arrow B', thereby removing the distal end 109 of the latching element 108 from the retaining member 112.

Figure 5:
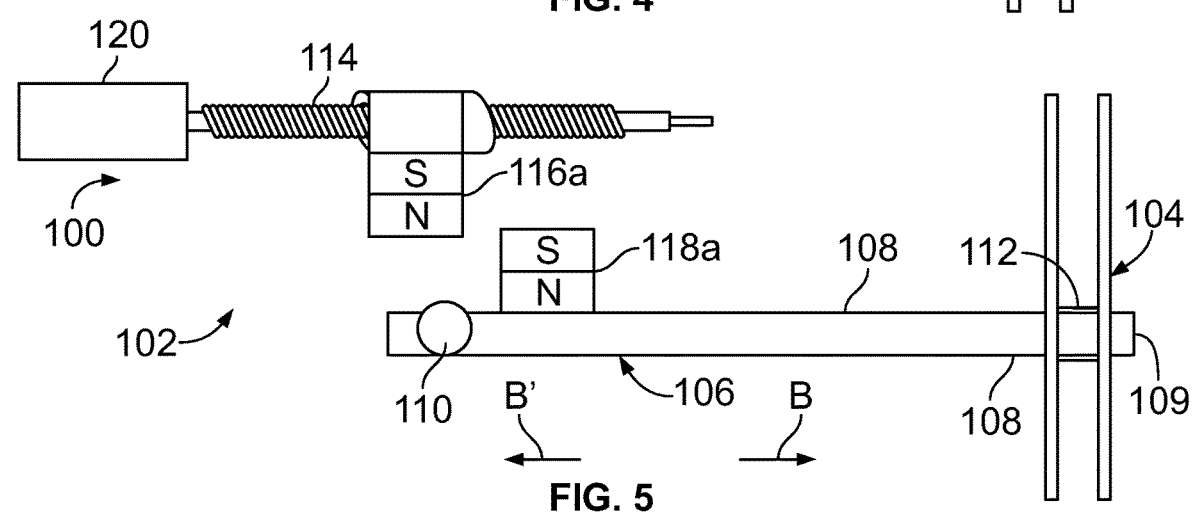
FIG. 5 illustrates a schematic diagram of the latching system in a manual override mode, according to an example of the present disclosure.

FIG. 5 illustrates a schematic diagram of the latching system 100 in a manual override mode, according to an example of the present disclosure. As an induvial grasps the engagement member 110 and moves the latch 106 in the direction of arrow B, the force exerted into the latch 106 may overcome the magnetic coupling between the first magnet 116a and the second magnet 118a, thereby uncoupling the first magnet 116a from the second magnet 118a, and allowing the latching element 108 to be manually moved into the retaining member 112. The magnetic force between the first magnet 116a and the second magnet 118a may cause the first magnet 116a to move back into alignment with the second magnet 118a, and thereby move the actuator 114 in response. Optionally, referring to FIGS. 1-5, the sensing device 124 can sense the uncoupling between the first magnet 116a and the second magnet 118a, and the control unit 122 can move the actuator 114 such that the first magnet 116a realigns with and recouples to the second magnet 118a.

While FIG. 5 shows the latching system 100 being manually overridden to move the latch 106 into a latched position with respect to the second component 104, the latching system 100 can be manually overridden to move the latch 106 into an unlatched position with respect to the second component 104. For example, when the latch 106 is in a latched position, as shown in FIGS. 4 and 5, an individual may manually engage the latch 106 in the direction of arrow B' to move the latch 106 into an unlatched position. The second magnet 118a may uncouple from the first magnet 116a during such motion, and the actuator 114 may then move the first magnet 116a and the second magnet 118a back into realignment and recoupling, as described herein.

Figure 6:
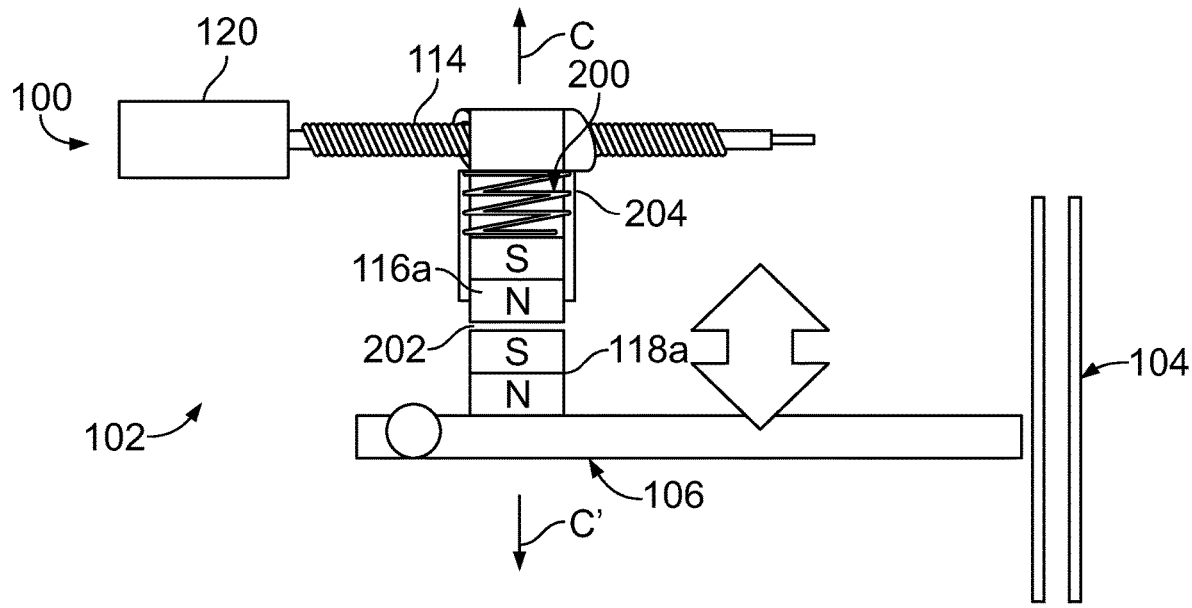
FIG. 6 illustrates a schematic diagram of the latching system in a latched position, according to an example of the present disclosure.

FIG. 6 illustrates a schematic diagram of the latching system 100 in a latched position, according to an example of the present disclosure. In at least one example, a spring 200 secures the first magnet 116a to the actuator 114. The spring 200 exerts a resistive spring force that pulls the first magnet 116a toward the actuator 114 in the direction of arrow C, thereby forming a gap 202 between the first magnet 116a and the second magnet 118a. The magnetic coupling between the first magnet 116a and the second magnet 118a causes the first magnet 116a to be pulled downwardly in the direction of arrow C', but the resistive spring force may be great enough to ensure that the gap 202 remains.

As shown, the first magnet 116a may couple to the second magnet 118a with the gap 202 therebetween, ensuring a contactless coupling. The gap 202 provides a small spacing (such as between 0.001-0.020 inches). The gap 202 allows for easier coupling and uncoupling between the first magnet 116a and the second magnet 118a, and reduces wear therebetween. Alternatively, the first magnet 116a and the second magnet 118a may couple to one another with no gap therebetween.

Figure 7:
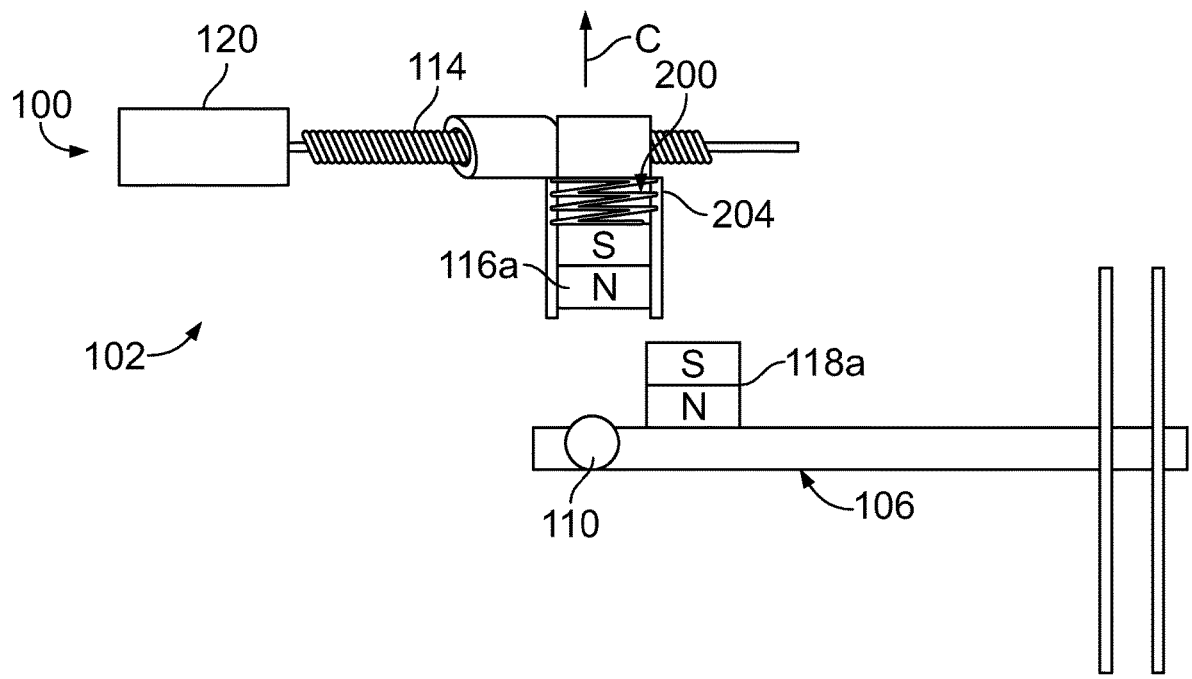
FIG. 7 illustrates a schematic diagram of the latching system in a manual override mode, according to an example of the present disclosure.

FIG. 7 illustrates a schematic diagram of the latching system 100 in a manual override mode, according to an example of the present disclosure. When the latch 106 is manually engaged, the first magnet 116a uncouples from the second magnet 118a, as described herein. As the first magnet 116a uncouples from the second magnet 118a, the spring 200 pulls the first magnet 116a closer to the actuator 114 in the direction of arrow C, thereby increasing the separation between the first magnet 116a and the second magnet 118a.

As such, the magnetic coupling between the first magnet 116a and the second magnet 118a is reduced, until the first magnet 116a is realigned with the second magnet 118a.

Referring to FIGS. 6 and 7, a sleeve 204 can be disposed around the first magnet 116a and the spring 200. The sleeve 204 constrains the motion of the spring 200 and the magnet 116a, such as to be substantially in the direction of arrows C and C', as described. Alternatively, the latching system 100 may not include the sleeve 204. Optionally, the second magnet 118a can be coupled to the latch 106 by a spring, which can be within a sleeve, in addition to, or in place of the spring 200 and the sleeve 204 shown in FIGS. 6 and 7.

The sleeve 204 provides a guide for the spring 200 and the first magnet 116a. The first magnet 116a floats within the guide provided by the sleeve 204, and anchored to the actuator 114 by the spring 200. The spring 200 pulls the first magnet 116a toward the actuator 114.

The force exerted by the spring 200 can be weaker than the magnetic force between the first magnet 116a and the second magnet 118a. For example, the gap 202 provided by the spring 200 can be between 0.1 inch and 0.5 inch, depending on the magnetic force between the first magnet 116a and the second magnet 118a.

Figure 8:
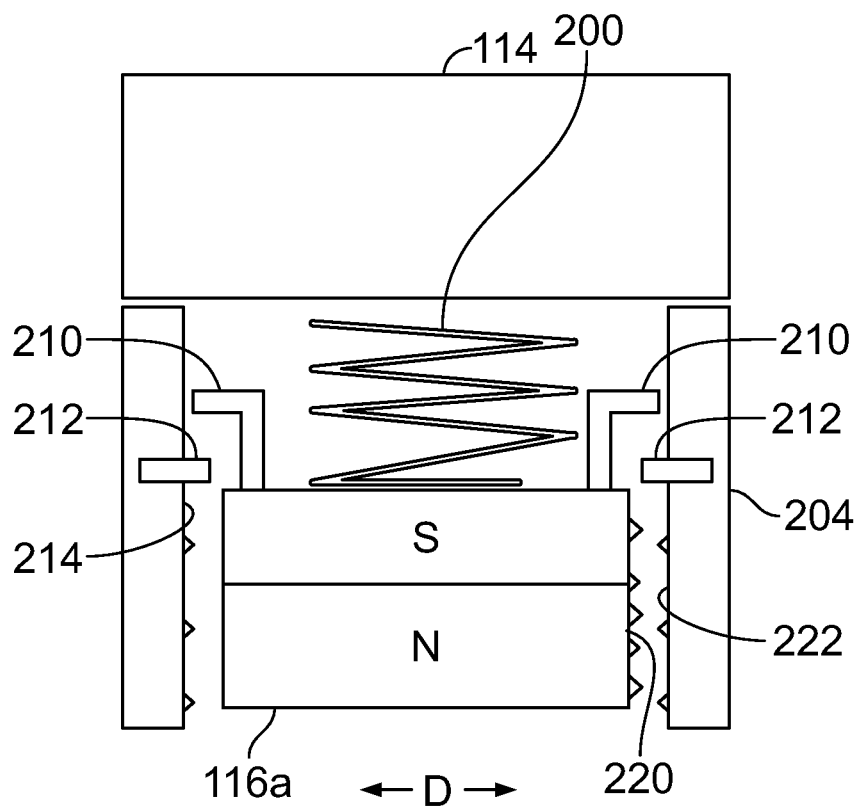
FIG. 8 illustrates an internal view of a first magnet within a sleeve, according to an example of the present disclosure.

FIG. 8 illustrates an internal view of the first magnet 116a within the sleeve 204, according to an example of the present disclosure. Extension stops 210 may extend from the first magnet 116a within the sleeve 204. The extension stops 210 radially extend from the first magnet 116a. The sleeve 204 includes stop protuberances 212 inwardly extending from internal surfaces 214. The extension stops 210 are configured to abut into the stop protuberances 212 to control a range of motion of the first magnet 116a, such as to ensure that the gap 202 (shown in FIG. 6) is provided between the first magnet 116a and the second magnet 118a. Alternatively, the first magnet 116a may not include the extension stops 210, and/or the sleeve 204 may not include the stop protuberances 212.

Additionally, outer circumferential surfaces of the first magnet 116a can include roughened protuberances 220. Similarly, internal surfaces 214 of the sleeve 204 can also include roughened protuberances 222. If and when the first magnet 116a is pulled laterally within the sleeve 204 in the directions of arrow D, the roughened protuberances 220 engage the roughened protuberances 222, thereby slowing and/or stopping further lateral shifting and/or downward extension. As such, engagement between the roughened protuberances 220 and 222 provides a brake that slows or prevents further motion of the first magnet 116a within the sleeve 204. The roughened surfaces can be formed through scoring, deposition of material, embossing, scratching, and/or the like. Alternatively, the first magnet 116a may not include the roughened protuberances 220, and/or the sleeve 204 may not include the roughened protuberances 222.

Referring to FIGS. 7 and 8, the spring 200 retracts toward the actuator 114, thereby pulling the first magnet 116a toward the actuator 114 when the first magnet 116a uncouples from the second magnet 118a. The retraction of the spring 200 prevents or otherwise reduces the potential of the first magnet 116a from pulling laterally on the second magnet 118a.

Figure 9:
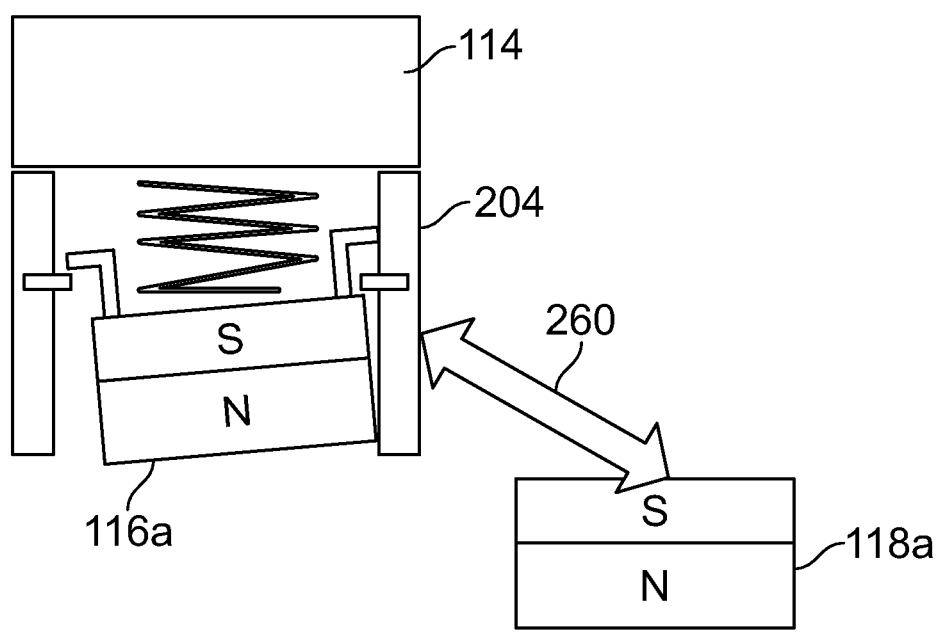
FIG. 9 illustrates a schematic diagram of the first magnet uncoupled from a second magnet, according to an example of the present disclosure.

FIG. 9 illustrates a schematic diagram of the first magnet 116a uncoupled from a second magnet 118a, according to an example of the present disclosure. Referring to FIGS. 8 and 9, when a magnetic side load 260 is present, the interaction between the roughened protuberances 220 and the roughened protuberances 222 prevent or otherwise reduce the potential of the first magnet 116a from moving outwardly from the sleeve 204. As described herein, one or both of the first magnet 116a and the sleeve 204 include roughened surfaces that provide a brake that prevents or otherwise reduced motion otherwise induced by the magnetic side load 260. As such, a roughened interface exists between the first magnet 116a and the sleeve 204. In contrast, as shown in FIG. 8, when the first magnet 116a is axially aligned with the second magnet 118a (such as when the magnetic side load 260 is not present), the roughened protuberances 220 are separated from the roughened protuberances 222, and the first magnet 116a and the second magnet 118a magnetically couple to one another.

Figure 10:
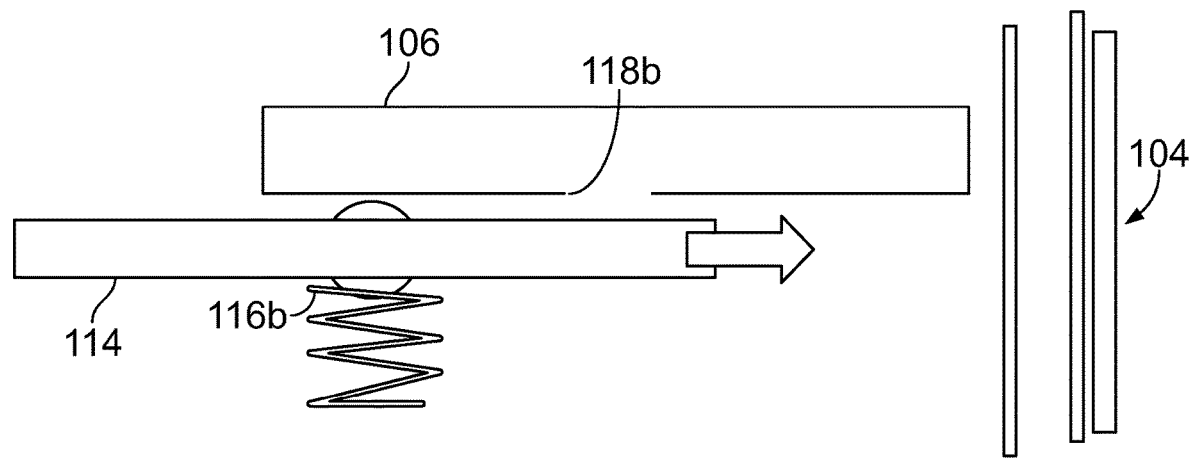
FIG. 10 illustrates a schematic diagram of a latch uncoupled from an actuator, according to an example of the present disclosure.
Figure 11:
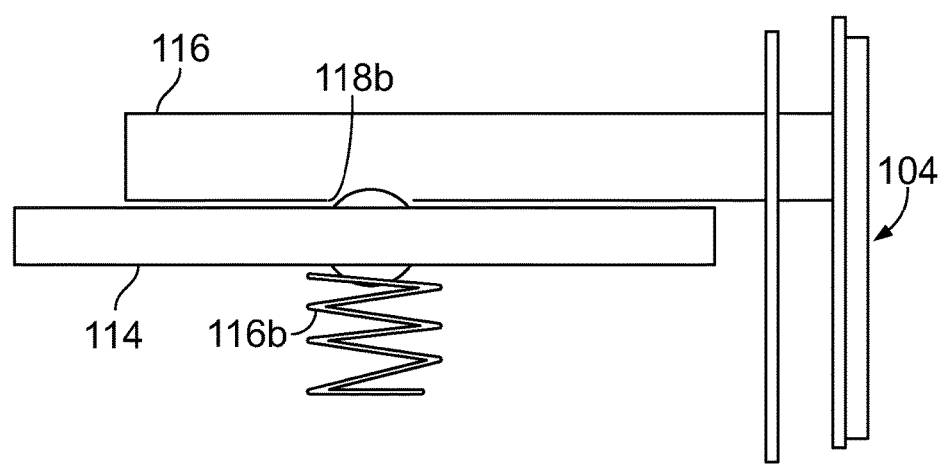
FIG. 11 illustrates a schematic diagram of the latch coupled to the actuator of FIG. 11.

FIG. 10 illustrates a schematic diagram of the latch 106 uncoupled from the actuator 114, according to an example of the present disclosure. FIG. 11 illustrates a schematic diagram of the latch 106 coupled to the actuator 114 of FIG. 11. Referring to FIGS. 10 and 11, instead of magnets, the latch 106 includes a detent 118b, and the actuator 114 includes a spring-biased member 116b (such as a spring-biased ball, snap, or other such structure), or vice versa. The spring-biased member 116b is an example of the first coupler 116 shown in FIG. 1, and the detent 118b is an example of the second coupler 118 shown in FIG. 1. The spring-biased member 116b is configured to be forced into an out of the detent 118b, as shown in FIGS. 10 and 11.

Figure 12:
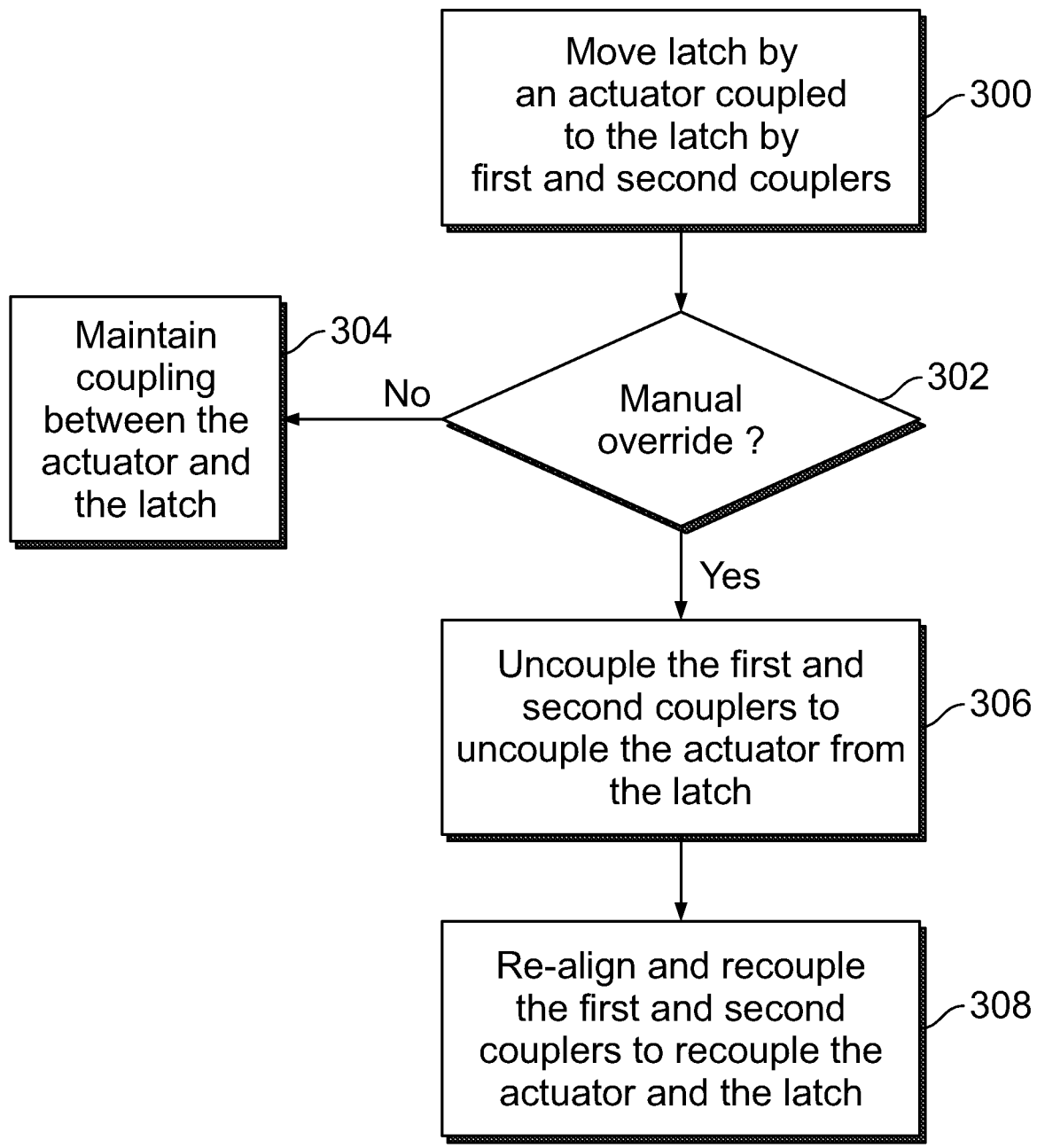
FIG. 12 illustrates a flow chart of a latching method, according to an example of the present disclosure.

FIG. 12 illustrates a flow chart of a latching method, according to an example of the present disclosure. Referring to FIGS. 1 and 12, at 300, the latch 106 is moved by the actuator 114 (such as between latched and unlatched positions) coupled to the latch 106 by the first coupler 116 coupled to the second coupler 118. As described, the first coupler 116 and the second coupler 118, while coupled together, are also separable (which can be separated by a manual override of the latch 106).

At 302, it is determined if there is a manual override. The manual override occurs when an individual manually operates the latch 106, instead of operating via the actuator 114 (which can be controlled by an associated engagement device, such as a switch, button, the touchless sensor 120, and/or the like). If there is no manual override at 302, the method proceeds to 304, at which the coupling between the first coupler 116 and the second coupler 118 is maintained.

If, however, there is a manual override at 302, the method proceeds to 306, at which the first coupler 116 and the second coupler 118 uncouple from one another, thereby uncoupling the actuator 114 from the latch 106. At 308, the first coupler 116 and the second coupler 118 can then be re-aligned and recoupled to one another, thereby recoupling the actuator 114 and the latch 106.

Figure 13:
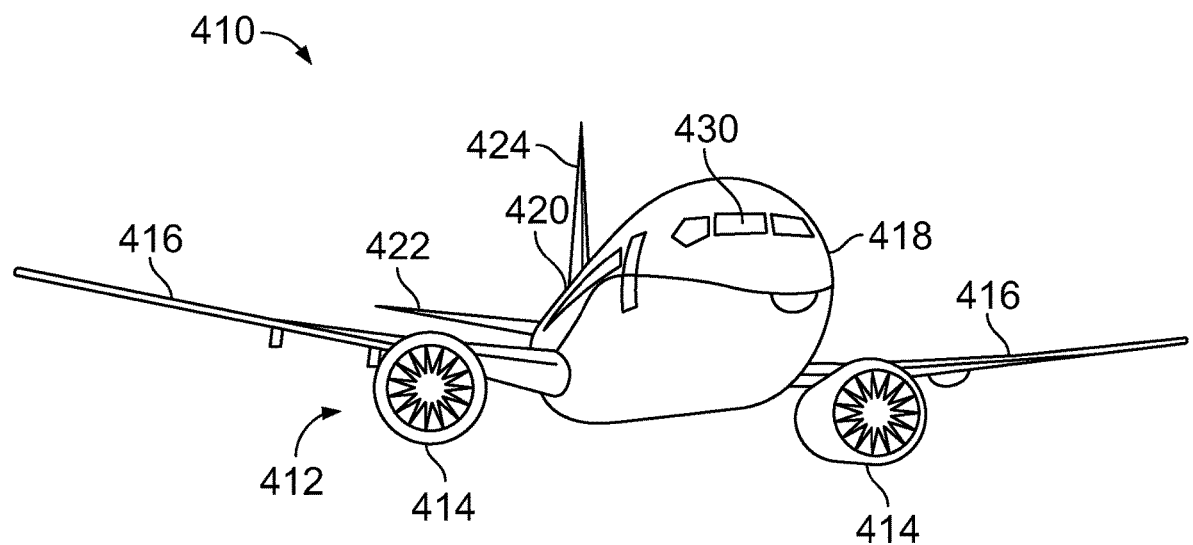
FIG. 13 illustrates a perspective front view of an aircraft, according to an example of the present disclosure.

FIG. 13 illustrates a perspective front view of an aircraft 410, according to an example of the present disclosure. The aircraft 410 includes a propulsion system 412 that includes engines 414, for example. Optionally, the propulsion system 412 may include more engines 414 than shown. The engines 414 are carried by wings 416 of the aircraft 410. In other embodiments, the engines 414 may be carried by a fuselage 418 and/or an empennage 420. The empennage 420 may also support horizontal stabilizers 422 and a vertical stabilizer 424.

The fuselage 418 of the aircraft 410 defines an internal cabin 430, which includes a flight deck or cockpit, one or more work sections (for example, galleys, personnel carry-on baggage areas, and the like), one or more passenger sections (for example, first class, business class, and coach sections), one or more lavatories, and/or the like. The latching systems and methods described herein can be used with various components of the aircraft 410, such as with respect to lavatory doors within the internal cabin 430.

Alternatively, instead of an aircraft, examples of the present disclosure may be used with various other vehicles, such as automobiles, buses, locomotives and train cars, watercraft, and the like. Further, examples of the present disclosure may be used with respect to fixed structures, such as commercial and residential buildings.

Figure 14:
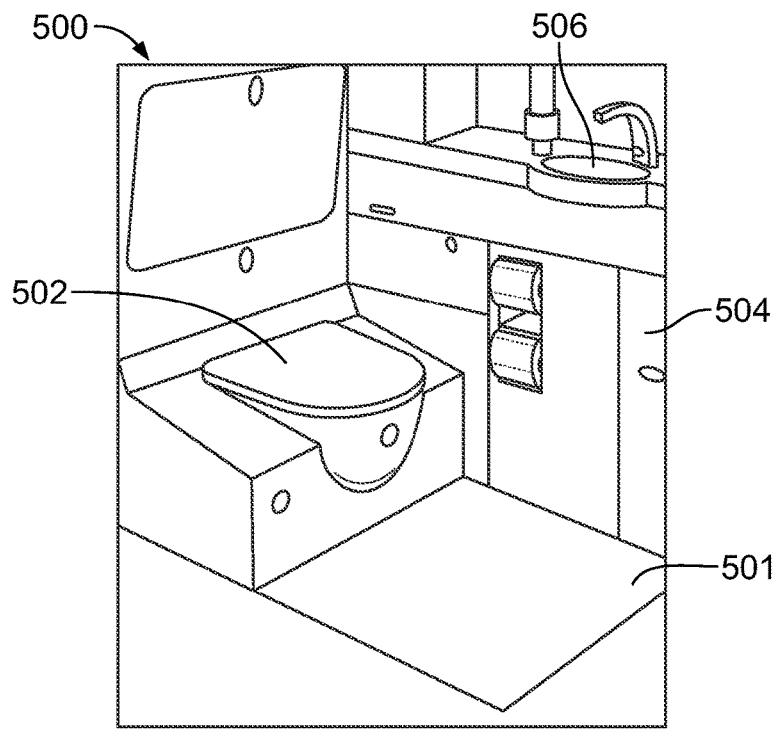
FIG. 14 illustrates a perspective internal view of a lavatory, according to an example of the present disclosure.

FIG. 14 illustrates a perspective internal view of a lavatory 500, according to an example of the present disclosure. The lavatory 500 is an example of an enclosed space or chamber, such as within the internal cabin 430 of the aircraft 410, shown in FIG. 13. The lavatory 500 includes a door leading therein. The latching systems and methods described herein can be used in relation to the door of the lavatory 500. The lavatory 500 may be onboard an aircraft, as described above. Optionally, the lavatory 500 may be onboard various other vehicles. In other examples, the lavatory 500 may be within a fixed structure, such as a commercial or residential building. The lavatory 500 includes a base floor 501 that supports a toilet 502, one or more cabinets 504, and a sink 506 or wash basin. The lavatory 500 may be arranged differently than shown. The lavatory 500 may include more or less components than shown.

Further, the disclosure comprises examples according to the following clauses:

Clause 1. A latching system configured to selectively latch and unlatch a first component in relation to a second component, the latching system comprising:
 an actuator;
 a first coupler secured to the actuator;
 a latch; and
 a second coupler secured to the latch,
 wherein the first coupler is configured to couple to the second coupler to couple the actuator to the latch, and
 wherein the first coupler is configured to uncouple from the second coupler to uncouple the actuator from the latch in response to the latch being manually operated.

Clause 2. The latching system of Clause 1, further comprising a touchless sensor operatively coupled to the actuator.

Clause 3. The latching system of Clauses 1 or 2, further comprising a sensing device configured to detect a relationship between the first coupler and the second coupler.

Clause 4. The latching system of Clause 3, further comprising a control unit in communication with the actuator and the sensing device, wherein the control unit is configured to operate the actuator to recouple the first coupler with the second coupler in response to the sensing device detecting that the first coupler is uncoupled from the second coupler.

Clause 5. The latching system of any of Clauses 1-4, wherein the first component is a door, and the second component is one or more of a frame, wall, or panel.

Clause 6. The latching system of any of Clauses 1-5, wherein a gap exists between the first coupler and the second coupler when the first coupler is coupled to the second coupler.

Clause 7. The latching system of any of Clauses 1-6, wherein the first coupler is a first magnet and the second coupler is a second magnet.

Clause 8. The latching system of Clause 7, further comprising a spring that secures the first magnet to the actuator, wherein the spring is configured to pull the first magnet toward the actuator.

Clause 9. The latching system of Clause 8, further comprising a sleeve disposed around the first magnet and the spring.

Clause 10. The latching system of Clause 9, wherein the first magnet comprises extension stops, and the sleeve comprises stop protuberances configured to engage the extension stops.

Clause 11. The latching system of Clauses 9 or 10, wherein a roughened interface is formed between the first magnet and the sleeve.

Clause 12. The latching system of any of Clauses 1-6, wherein the first coupler comprises one of a detent or a spring-biased member, and wherein the second coupler comprises the other of the detect of the spring-biased member.

Clause 13. A latching method configured to selectively latch and unlatch a first component in relation to a second component, the latching method comprising:
 coupling a first coupler secured to an actuator to a second coupler secured to a latch, wherein said coupling couples the actuator to the latch; and
 uncoupling the first coupler from the second coupler to uncouple the actuator from the latch in response to the latch being manually operated.

Clause 14. The latching method of Clause 13, further comprising operatively coupling a touchless sensor to the actuator.

Clause 15. The latching method of Clauses 13 or 14, further comprising detecting, by a sensing device, a relationship between the first coupler and the second coupler.

Clause 16. The latching method of Clause 15, further comprising operating, by a control unit in communication with the actuator and the sensing device, the actuator to recouple the first coupler with the second coupler in response to the sensing device detecting that the first coupler is uncoupled from the second coupler.

Clause 17. The latching method of any of Clauses 13-16, further comprising securing, by a spring the first coupler to the actuator, wherein the spring is configured to pull the first coupler toward the actuator.

Clause 18. The latching method of Clause 17, further comprising disposing a sleeve around the first coupler and the spring.

Clause 19. A system comprising:
 a first component;
 a second component; and
 a latching system coupled to one or both of the first component or the second component, wherein the latching system is configured to selectively latch and unlatch the first component in relation to the second component, the latching system comprising:
 an actuator;
 a first coupler secured to the actuator;
 a latch; and
 a second coupler secured to the latch,
 wherein the first coupler is configured to couple to the second coupler to couple the actuator to the latch, and
 wherein the first coupler is configured to uncouple from the second coupler to uncouple the actuator from the latch in response to the latch being manually operated.

Clause 20. The system of Clause 19, wherein the latching system further comprises:
 a touchless sensor operatively coupled to the actuator;
 a sensing device configured to detect a relationship between the first coupler and the second coupler; and a control unit in communication with the actuator and the sensing device, wherein the control unit is configured to operate the actuator to recouple the first coupler with the second coupler in response to the sensing device detecting that the first coupler is uncoupled from the second coupler.

As described herein, examples of the present disclosure provide improved latching systems and methods, which may include touchless sensors. Further, examples of the present disclosure provide latching systems and methods that also allow for manual operation of a mechanical feature, such as a latch. Moreover, examples of the present disclosure provide latching systems and methods that allow for manual override in case a touchless sensor does not operate properly. Further, examples of the present disclosure provide latching systems and methods having touchless sensors and mechanical features that do not interfere with each other, and are able to reset to a default condition appropriate for a desired door status (open, closed, locked, unlocked, latched, unlatched).

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the parameters of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A latching system configured to selectively latch and unlatch a first component in relation to a second component, the latching system comprising:
    an actuator;
    a first coupler secured to the actuator, wherein the first coupler is a first magnet;
    a spring that secures the first magnet to the actuator, wherein the spring is configured to pull the first magnet toward the actuator;
    a latch including a latching element coupled to an engagement member, wherein the engagement member is configured to be manually engaged and moved to selectively lock and unlock the first component in relation to the second component;
    a second coupler secured to the latch, wherein the second coupler is a second magnet;
    a touchless sensor operatively coupled to the actuator, wherein the touchless sensor is configured to be engaged in a touchless manner to selectively lock and unlock the first component in relation to the second component; and
    a sensing device configured to detect a relationship between the first coupler and the second coupler,
    wherein the first coupler is configured to couple to the second coupler to couple the actuator to the latch, and
    wherein the first coupler is configured to uncouple from the second coupler to uncouple the actuator from the latch in response to the latch being manually operated.

2. The latching system of claim 1, further comprising a control unit in communication with the actuator and the sensing device, wherein the control unit is configured to operate the actuator to recouple the first coupler with the second coupler in response to the sensing device detecting that the first coupler is uncoupled from the second coupler.

3. The latching system of claim 1, wherein the first component is a door, and the second component is one or more of a frame, wall, or panel.

4. The latching system of claim 1, wherein a gap exists between the first coupler and the second coupler when the first coupler is coupled to the second coupler.

5. The latching system of claim 1, further comprising a sleeve disposed around the first magnet and the spring.

6. The latching system of claim 5, wherein the first magnet comprises extension stops, and the sleeve comprises stop protuberances configured to engage the extension stops.

7. The latching system of claim 5, wherein a roughened interface is formed between the first magnet and the sleeve.

8. A latching method configured to selectively latch and unlatch a first component in relation to a second component, the latching method comprising:
    coupling a first coupler secured to an actuator to a second coupler secured to a latch including a latching element coupled to an engagement member, wherein said coupling couples the actuator to the latch, wherein the engagement member is configured to be manually engaged and moved to selectively lock and unlock the first component in relation to the second component, wherein a touchless sensor is operatively coupled to the actuator, wherein the touchless sensor is configured to be engaged in a touchless manner to selectively lock and unlock the first component in relation to the second component;

securing, by a spring, the first coupler to the actuator, wherein the spring is configured to pull the first coupler toward the actuator;

uncoupling the first coupler from the second coupler to uncouple the actuator from the latch in response to the latch being manually operated; and detecting, by a sensing device, a relationship between the first coupler and the second coupler.

9. The latching method of claim 8, further comprising operating, by a control unit in communication with the actuator and the sensing device, the actuator to recouple the first coupler with the second coupler in response to the sensing device detecting that the first coupler is uncoupled from the second coupler.

10. The latching method of claim 8, further comprising disposing a sleeve around the first coupler and the spring.

11. A system comprising:
a first component;
a second component; and
a latching system coupled to one or both of the first component or the second component, wherein the latching system is configured to selectively latch and unlatch the first component in relation to the second component, the latching system comprising:
  an actuator;
  a first coupler secured to the actuator, wherein the first coupler comprises one of a detent or a spring-biased member;
  a latch including a latching element coupled to an engagement member, wherein the engagement member is configured to be manually engaged and moved to selectively lock and unlock the first component in relation to the second component;
  a second coupler secured to the latch, wherein the second coupler comprises the other of the detent or the spring-biased member;
  a touchless sensor operatively coupled to the actuator, wherein the touchless sensor is configured to be engaged in a touchless manner to selectively lock and unlock the first component in relation to the second component;
  a sensing device configured to detect a relationship between the first coupler and the second coupler,
  wherein the first coupler is configured to couple to the second coupler to couple the actuator to the latch, and
  wherein the first coupler is configured to uncouple from the second coupler to uncouple the actuator from the latch in response to the latch being manually operated.

12. The system of claim 11, wherein the latching system further comprises a control unit in communication with the actuator and the sensing device, wherein the control unit is configured to operate the actuator to recouple the first coupler with the second coupler in response to the sensing device detecting that the first coupler is uncoupled from the second coupler.

13. The latching system of claim 1, wherein the sensing device comprises one or more of a magnetic sensor, an infrared sensor, or an ultrasonic sensor.

14. The latching system of claim 1, wherein the sensing device is configured to detect a separation between the first coupler and the second coupler.

15. The latching system of claim 1, wherein the sensing device comprises an infrared sensor.

16. The latching system of claim 1, wherein the sensing device comprises an ultrasonic sensor.

17. A latching system configured to selectively latch and unlatch a first component in relation to a second component, the latching system comprising:
an actuator;
a first coupler secured to the actuator, wherein the first coupler comprises one of a detent or a spring-biased member;
a latch including a latching element coupled to an engagement member, wherein the engagement member is configured to be manually engaged and moved to selectively lock and unlock the first component in relation to the second component;
a second coupler secured to the latch, wherein the second coupler comprises the other of the detent or the spring-biased member;
a touchless sensor operatively coupled to the actuator, wherein the touchless sensor is configured to be engaged in a touchless manner to selectively lock and unlock the first component in relation to the second component; and
a sensing device configured to detect a relationship between the first coupler and the second coupler,
wherein the first coupler is configured to couple to the second coupler to couple the actuator to the latch, and
wherein the first coupler is configured to uncouple from the second coupler to uncouple the actuator from the latch in response to the latch being manually operated.

18. The latching system of claim 17, further comprising a control unit in communication with the actuator and the sensing device, wherein the control unit is configured to operate the actuator to recouple the first coupler with the second coupler in response to the sensing device detecting that the first coupler is uncoupled from the second coupler.

19. The latching system of claim 17, wherein the first component is a door, and the second component is one or more of a frame, wall, or panel.

20. The latching system of claim 17, wherein a gap exists between the first coupler and the second coupler when the first coupler is coupled to the second coupler.

* * * * *